Patented Apr. 5, 1932

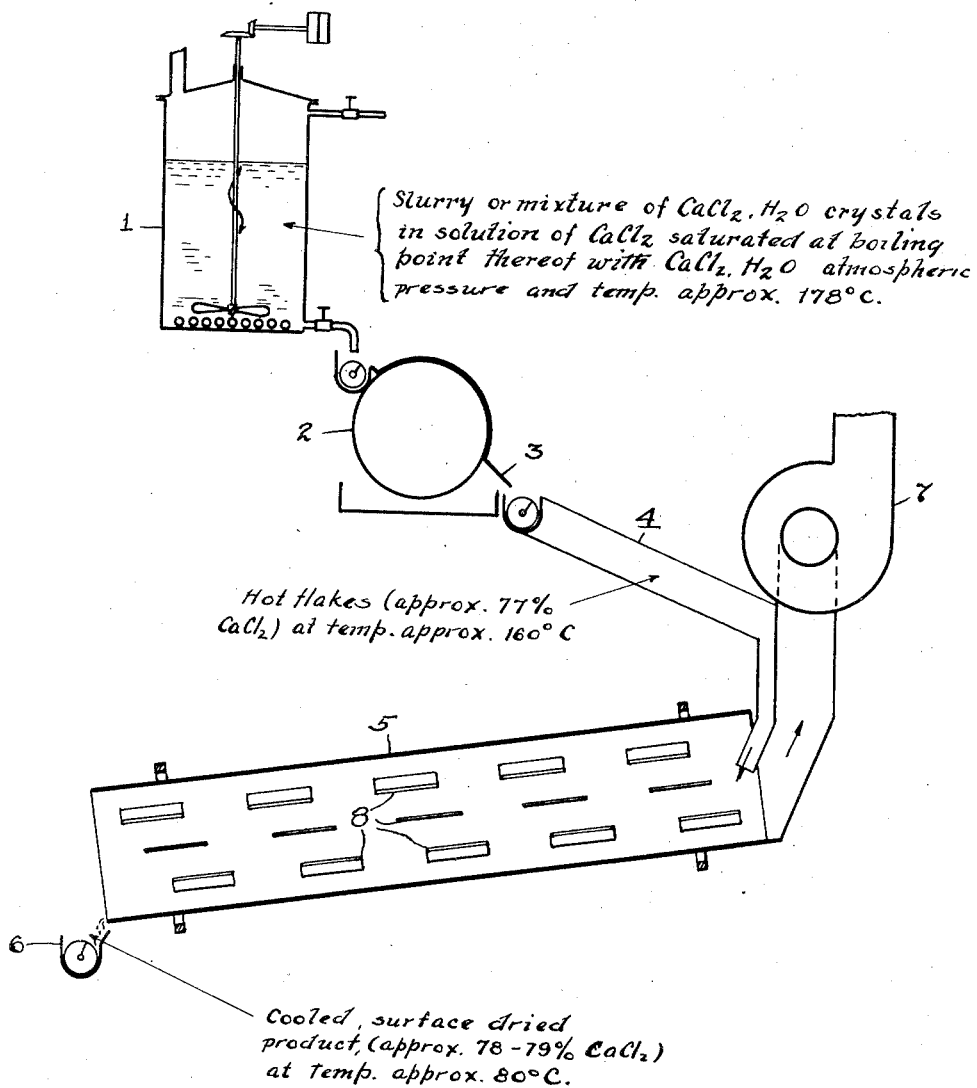

1,852,303

UNITED STATES PATENT OFFICE

SHELDON B. HEATH, OF MIDLAND, MICHIGAN, ASSIGNOR TO THE DOW CHEMICAL COMPANY, OF MIDLAND, MICHIGAN, A CORPORATION OF MICHIGAN

CALCIUM CHLORIDE AND METHOD OF MAKING SAME

Application filed November 6, 1928. Serial No. 317,507.

My invention relates to improvements in the preparation of calcium chloride containing water of crystallization in the form of particles exhibiting free-flowing characteristics and reduced tendency to cake in the package.

Calcium chloride is produced in large quantity, particularly in the form of particles which are free-flowing and exhibit non-caking tendency in the package. These particles contain preferably less crystal water than corresponds to the dihydrate $CaCl_2.2H_2O$. The so prepared particles are then superficially dried by bringing them into counter current relation with a heated current of air, specifically the products of combustion of fuel. They are then cooled in a counter current of air to condition them for packaging.

In the prevailing method, a solution of calcium chloride is concentrated by boiling to a composition ranging from 71 to 75 per cent. anhydrous calcium chloride and is then flaked. I have noted that if sufficiently hot particles of such flaked calcium chloride be subjected to cooling in a counter current of air, they become superficially dried, losing from one and one-half to two per cent. of moisture which is self evaporated by the heat content of the particles without the aid of external heat from fuel or otherwise.

To the accomplishment of the foregoing result, the invention, then, consists of the steps and product hereinafter fully described and particularly pointed out in the claims, the annexed drawing illustrating one typical form of apparatus adapted for the carrying out of such steps, such disclosed apparatus constituting, however, but one of the various ways in which the principle of the invention may be used.

In said annexed drawing:—

The single figure there appearing illustrates in diagrammatic fashion an apparatus arranged for the carrying out of my improved process or method.

One mode of practicing my improved method accordingly comprises cooling a hot divided form of calcium chloride containing water of crystallization in a current of air, preferably in counter current relation, whereby water is removed from the surface layers of the so treated particles, and I obtain thereby a product exhibiting free-flowing and non-caking characteristics without employing outside heat for the superficial drying.

I have found it possible to produce a granular or flaked form of calcium chloride containing markedly less water of crystallization than corresponds to the dihydrate crystal by solidifying in the aforesaid subdivided form a slurry comprised of crystals of the mono-hydrate in a mother liquid saturated with same at the atmospheric boiling point thereof, such method being more particularly described and claimed in my copending application Serial No. 343,961, filed March 2, 1929. I have now discovered further that if hot particles of calcium chloride thus made from such a slurry are at once subjected to air cooling in counter current as described, a satisfactory packaging grade of chloride will be so obtained without the use of furnace heat for superficial drying. Such procedure accordingly constitutes another mode of practicing my improved method.

More specifically, I have discovered that if the calcium chloride solution be concentrated to salt out the monohydrate crystals producing a thick slurry which may still be caused to flow, as by pumping, and having a finishing temperature of approximately 178° C., (or more, if concentrated under pressure), such a slurry has a very sharp freezing point forming upon flaking a good hard strong particle above 160° C., such particles then containing enough heat to effect self evaporation of one and one-half to two per cent. of water when cooled in a counter current air cooler. For example, if the hot particles at 160° C. contain 77 per cent. $CaCl_2$, the cooled product at 80° C. will analyze from 78 to 79 per cent. $CaCl_2$, the increase in percentage content of anhydrous solids being due to removal of water from the surface layers of the so treated particles.

I may further concentrate the solution of calcium chloride under pressure in excess of atmospheric pressure, finishing at a still higher temperature and then proceed to solidify and form into particles the solidified salt, following with cooling of the so formed still hot particles as described. Such procedure constitutes still another mode of practicing my improved method.

My preferred method of forming the particles is to flake the mixture of crystals and mother liquor upon a rotary flaking drum, either dipping into the mixture of crystals and mother liquor, or having the mixture fed onto the drum and distributed thereon by suitable means.

In the accompanying drawing the single figure there appearing indicates in more or less diagrammatic fashion the preferred form of procedure. The calcium chloride solution is concentrated by boiling in the kettle 1 provided with an agitator, and steam coils to supply the heat. When concentrated to a consistency, due to salting out of monohydrate crystals, as thick as may be handled conveniently, the slurry is then run or pumped to the flaker drum 2 upon which it forms a thin sheet of solidified chloride, being delivered by the knife 3 to the conveyor 4 as a hot flaked product. The hot flaked product is then fed to the rotary cooler 5 from which it emerges to the conveyor 6 in the cooled superficially dried condition. An exhauster 7 draws a current of air through the cooler. The latter may be advantageously provided with a series of shovels 8 for lifting the flakes and dropping them through the air current.

Other methods of producing particles may be employed, such as spraying the hot slurry with an air or steam jet into a collecting chamber and then cooling same in the manner described or the slurry may be allowed to cool and solidify in suitable molds, such as shallow pans, and then afterwards be broken up and granulated and fed to the cooler for superficial drying while still sufficiently hot for the purpose.

By means of my improved method I am able to obtain, without employing the customary step of drying by furnace heat, a flaked or granulated product having free-flowing and non-caking characteristics.

Other forms may be employed embodying the features of my invention instead of the one here explained, change being made in the form or construction, provided the elements stated by any of the following claims or the equivalent of such stated elements be employed, whether produced by my preferred method or by others embodying steps equivalent to those stated in the following claims.

I therefore particularly point out and distinctly claim as my invention:—

1. In a method of preparing a partially dehydrated calcium chloride in the form of superficially dried particles, the steps which consist in chilling and mechanically comminuting a mixture of calcium chloride monohydrate crystals and the mother liquor thereof to solidify the same in the form of solid particles and air-cooling the particles, whereby the latter are superficially dehydrated by self-evaporation of water.

2. In a method of preparing a partially dehydrated calcium chloride in the form of superficially dried particles, the steps which consist in flaking a mixture of calcium chloride monohydrate crystals and the mother liquor thereof and air-cooling the flake particles, whereby the latter are superficially dehydrated by self-evaporation of water.

3. In a method of preparing a partially dehydrated calcium chloride in the form of superficially dried particles, the steps which consist in chilling and mechanically comminuting a mixture of calcium chloride monohydrate crystals and the mother liquor thereof to solidify the same in the form of solid particles and contacting the particles while still hot with a counter-flowing current of unheated air, whereby the latter are cooled and superficially dehydrated by self-evaporation of water.

4. In a method of preparing a partially dehydrated calcium chloride in the form of superficially dried particles, the steps which consist in flaking a mixture of calcium chloride monohydrate crystals and the mother liquor thereof and contacting the flake particles while still hot with a counter-flowing current of unheated air, whereby the latter are cooled and superficially dehydrated by self-evaporation of water.

5. The method of preparing a partially dehydrated calcium chloride in the form of superficially dried particles which comprises concentrating a solution of calcium chloride by evaporation until the $CaCl_2$ content thereof is in excess of 75 per cent, chilling and mechanically comminuting the hot concentrated mixture of crystals and mother liquor thereby obtained to solidify the same in the form of solid particles and contacting the particles while still hot with a counter-flowing current of unheated air, whereby the latter are cooled and superficially dehydrated by self-evaporation of water.

6. The method of preparing a partially dehydrated calcium chloride in the form of superficially dried particles which comprises concentrating a solution of calcium chloride by evaporation to salt out crystals of calcium chloride monohydrate and form a slurry of crystals and mother liquor thereof having a consistency to permit pumping, chilling and mechanically comminuting the slurry to solidify the same in the form of solid particles and contacting the particles while still hot with a counter-flowing current of unheated air, whereby the latter are cooled and superficially dehydrated by self-evaporation of water.

7. The method of preparing a partially dehydrated calcium chloride in the form of superficially dried particles which comprises concentrating a solution of calcium chloride by evaporation to a temperature of approximately 178° C., chilling and mechanically comminuting a mixture of crystals and mother liquor thereby obtained to solidfy the same in the form of solid particles and contacting the particles while still hot with a counterflowing current of unheated air, whereby the latter are cooled and superficially dehydrated by self-evaporation of water.

8. The method of preparing a partially dehydrated calcium chloride in the form of superficially dried particles which comprises concentrating a solution of calcium chloride by evaporation to a temperature of approximately 178° C., flaking the crystal slurry thereby obtained to solidify the same in the form of solid particles and contacting the particles while still hot with a counter-flowing current of unheated air, whereby the latter are cooled and superficially dehydrated by self-evaporation of water.

Signed by me this 17th day of October, 1928.

SHELDON B. HEATH.